(12) United States Patent
Barbour et al.

(10) Patent No.: US 7,281,469 B1
(45) Date of Patent: Oct. 16, 2007

(54) COOKING SUPPORT FRAME FOR FOOD ITEMS

(75) Inventors: Rodney A. Barbour, Brandon, MS (US); Wayne A. Neal, Jackson, MS (US)

(73) Assignee: Barbour International, Inc., Brandon, MI (US)

( * ) Notice: Subject to any disclaimer, the term of this patent is extended or adjusted under 35 U.S.C. 154(b) by 425 days.

(21) Appl. No.: 10/710,080

(22) Filed: Jun. 17, 2004

(51) Int. Cl.
*A47J 43/18* (2006.01)

(52) U.S. Cl. .............................. 99/426; 99/448; 99/449; 211/181.1

(58) Field of Classification Search .................. 99/426, 99/448, 449, 450; 211/181.1, 60.1, 175
See application file for complete search history.

(56) References Cited

U.S. PATENT DOCUMENTS

| | | | |
|---|---|---|---|
| 161,741 A * | 4/1875 | Dartt ........................... 229/109 |
| 1,061,431 A * | 5/1913 | West ............................ 99/419 |
| 3,532,225 A * | 10/1970 | Reed ........................ 211/181.1 |
| 4,458,585 A | 7/1984 | Erbach |
| 4,942,862 A | 7/1990 | Alden et al. |
| 5,730,046 A | 3/1998 | Battaglia et al. |
| 6,460,452 B1 | 10/2002 | Hester |
| 6,503,551 B1 | 1/2003 | Hester |
| 6,557,460 B2 | 5/2003 | Hester |
| 6,827,006 B1 * | 12/2004 | D'Amato et al. .............. 99/426 |
| 6,945,161 B1 * | 9/2005 | Battaglia et al. .............. 99/448 |
| 7,040,219 B1 * | 5/2006 | D'Amato et al. .............. 99/426 |

OTHER PUBLICATIONS

E*Z Legs Chicken Rack; "The Juciest Chicken You'll Ever Eat!", E*Z Products—Home; 3 pgs. Jun. 23, 2004, http://www.ezlegs.com/.

* cited by examiner

*Primary Examiner*—Reginald L. Alexander
(74) *Attorney, Agent, or Firm*—McGarry Bair PC

(57) ABSTRACT

A cooking support frame comprises a wire rack assembly fabricated from wire subassemblies having slots, crimps, and bends configured for supporting food items such as poultry legs and wings, pork ribs, corn, vegetables, bread, and the like above a conventional cooking surface. An open base supports a pair of opposed uprights having handles formed therein. The uprights support a hanger assembly formed with slots and crimps for holding poultry wings and legs in a generally vertical position. The hanger assembly can comprise an arrangement of removable skewers. The hanger assembly also defines a basket for supporting larger cuts of meat, vegetables, bread, and the like. The open base can be formed with an integral rib rack for supporting pork ribs in a generally vertical position. The cooking support frame is configured for nesting of a plurality of support frames together for shipping, handling, and displaying.

17 Claims, 22 Drawing Sheets

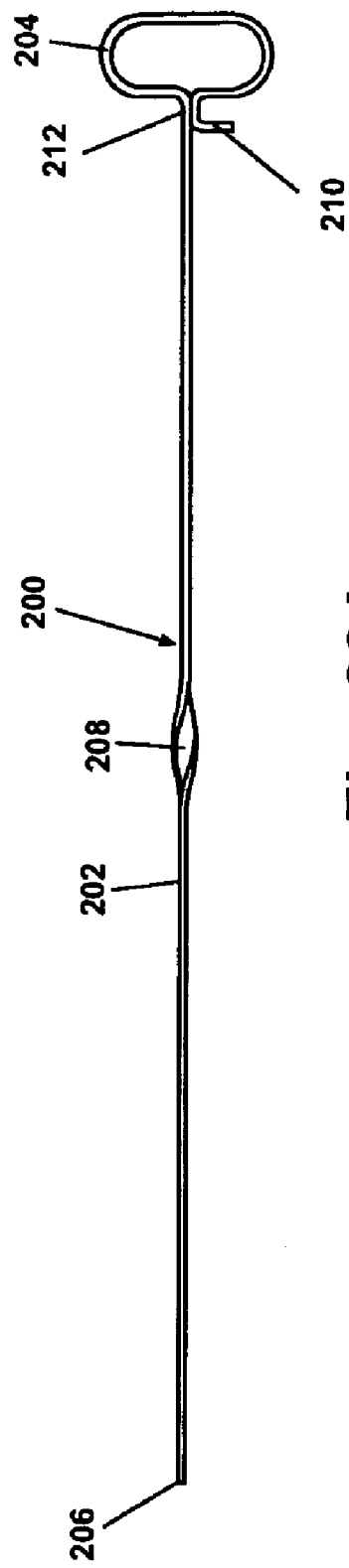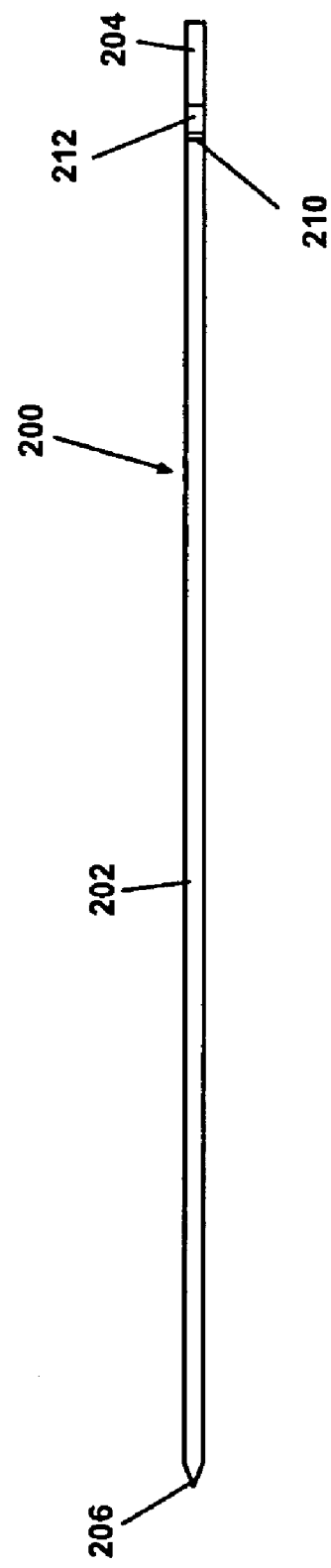
Fig. 23A
Fig. 23B

COOKING SUPPORT FRAME FOR FOOD ITEMS

FIELD OF THE INVENTION

The invention relates generally to accessories for barbeque grills, and more particularly to support frames for supporting food items during grilling, baking, and frying.

DESCRIPTION OF THE RELATED ART

Outdoor cooking using gas or charcoal-fired grills and smokers is widely done. Popular food items for grilling and smoking include poultry wings and legs, pork ribs, vegetables such as sweet corn, and the like. In the retail grocery market, packs of chicken wings and legs greatly outsell whole or quartered chickens, in part due to the great popularity of buffalo wings and barbequed legs. Grilling turkeys is becoming increasingly popular, as is grilling vegetables. Barbequed pork ribs are a staple of summer fare. Nevertheless, chicken remains a favorite food for grilling. The popularity of grilled foods has also led to oven barbequing, particularly when outdoor cooking is not available.

When grilling poultry wings and legs, several complications arise. Wings and legs are generally laid horizontally on a grill surface, with heat rising from below. The wings and legs cover a large portion of the grill area relative to the volume of the wings and legs, thus limiting the quantity of food items that can be cooked. Uneven heat from beneath the grill surface can result in some food items that are overcooked and others that are undercooked, or food items that are both. To avoid this problem, the chef must frequently monitor and move, e.g. turn or reposition, the food during cooking.

With frequent movement of the poultry pieces, heat and smoke are lost whenever the grill lid or oven door are opened. Heat loss from repeatedly opening the lid or door lengthens the time needed for proper cooking. Raising the lid also exposes the chef to smoke in the eyes, plus the risk of singed hair and minor burns from flare-ups. The risk from smoke and flare-ups is greater when applying grilling sauce to the food items.

Chicken wings are relatively thin. Occasionally, one can fall between the grill wires into the fire below. Also, portions of both wings and legs, e.g. wing tips and the "knuckle" end of legs, can fall between the grill spaces, lodge therein, and become charred. Chicken wings and legs have variable thicknesses of meat along the length of the bone. It is difficult to sufficiently cook the thick portion of meat without overcooking, drying, or burning the thinner portions.

When oven cooking, poultry parts must be laid horizontally in a baking pan. The poultry parts must be turned at least once during cooking to bake evenly. Opening the oven door to turn the poultry results in heat loss, thus lengthening the cooking time. An increased risk of burns arises due to the cook accidentally touching a hot oven surface while turning the pieces or applying grilling sauce.

Liquefied fat that is generated during cooking is held in the pan and remains on the meat, even after removal from the baking pan. This residual fat is then consumed along with the meat.

U.S. Pat. No. 4,942,862 describes a rack system comprising a rectilinear, open base frame supporting one or more food racks. The food racks can hold racks of ribs in a semi-vertical position so that more slabs can be cooked at one time on a given grill space. The rack system is unsuitable for holding poultry wings and legs in a vertical position. Indeed, the patent fails to even describe the use of the rack system for cooking poultry legs or wings.

U.S. Pat. Nos. 6,460,452, 6,503,551, and 6,557,460 describe a device, marketed under the trademark ChickCAN Rack™, for supporting a whole chicken in a vertical position directly on a grill surface. It cannot be used to cook just wings and legs.

U.S. Pat. No. 5,730,046 describes a device for suspending one or more chicken legs in a vertical orientation over a grill surface. The device comprises a plate having slots and holes into which the legs are inserted. The plate inhibits access to the legs in order to apply grilling sauce or to remove pieces that have completed cooking; and it cannot suspend an entire chicken leg below the plate for even cooking of the leg.

A food grilling rack asserted to be a commercial embodiment of the device described in U.S. Pat. No. 5,730,046 is marketed under the trade name "E*Z Legs" and comprises three wire cradles suspended from a wire upright extending upwardly from one edge of a wire base. Each wire cradle is adapted to support a plurality of food items. In order to remove a single food item from a wire cradle, it is generally necessary to first remove one or more of the other food items from the cradle. In order to securely suspend a food item from a wire cradle, it is generally necessary that the thickness of the food item be greater than the width of the cradle. Nevertheless, any shrinkage of the food item during cooking can result in the food item dropping from the cradle onto the underlying cooking surface.

U.S. Pat. No. 4,458,585 describes a device comprising a cradle portion adapted to receive an elongated food item leaning against, but not suspended from, the cradle portion.

SUMMARY OF THE INVENTION

A cooking support frame comprises an open base adapted to rest on a cooking surface, at least one upright extending from the open base in a direction away from a cooking surface upon which the open base may rest, and at least one wire hanger on the at least one upright for supporting a food item above the cooking surface, wherein the at least one wire hanger comprises at least one U-shaped cradle oriented for suspending a food item above the cooking surface. The at least one U-shaped cradle can comprise up to 24 cradles.

The at least one U-shaped cradle can be adapted for suspending at least one poultry wing or at least one poultry leg.

The cooking support frame can be inserted through the open base of an identical cooking support frame so that the cooking support frames are in a compact, nested configuration. The cooking support frame can comprise a pair of identical subassemblies conjoined along the medial plane of the cooking support frame.

The at least one U-shaped cradle can open toward the open base or away from the open base. The at least one U-shaped cradle can be adapted to engage at least one poultry wing tip.

The at least one U-shaped cradle can comprise a pair of U-shaped cradles separated by at least one bridge, and the at least one bridge can be adapted for suspending at least one poultry wing and at least one poultry wing tip.

The at least one hanger can comprise a pair of lateral hangers and a center hanger, the lateral hangers being adapted for suspending at least one poultry wing, and the center hanger being adapted to engage at least one poultry wing tip. The at least one hanger can comprise a pair of lateral hangers, and the lateral hangers can be adapted for suspending at least one poultry wing and for engaging at least one poultry wing tip in the at least one U-shaped cradle.

The lateral hangers and the center hanger can define a basket for supporting food items above the cooking surface. The cooking support frame can further comprise a rib support adapted to support a rack of ribs in a generally vertical orientation relative to the cooking surface. The rib support can be wire, and can extend from the open base in a direction away from the cooking surface upon which the open base may rest.

The cooking support frame can further comprise a support connector for removably attaching the at least one hanger to the open base. The at least one hanger can comprise at least one skewer. The at least one upright can further comprise at least one handle for lifting or transporting the cooking support frame.

BRIEF DESCRIPTION OF THE DRAWINGS

FIGS. 23A-B are plan and side elevation views, respectively, of an alternate skewer for use with the cooking support frame illustrated in FIG. 18.

DESCRIPTION OF THE PREFERRED EMBODIMENT

Figure 1:
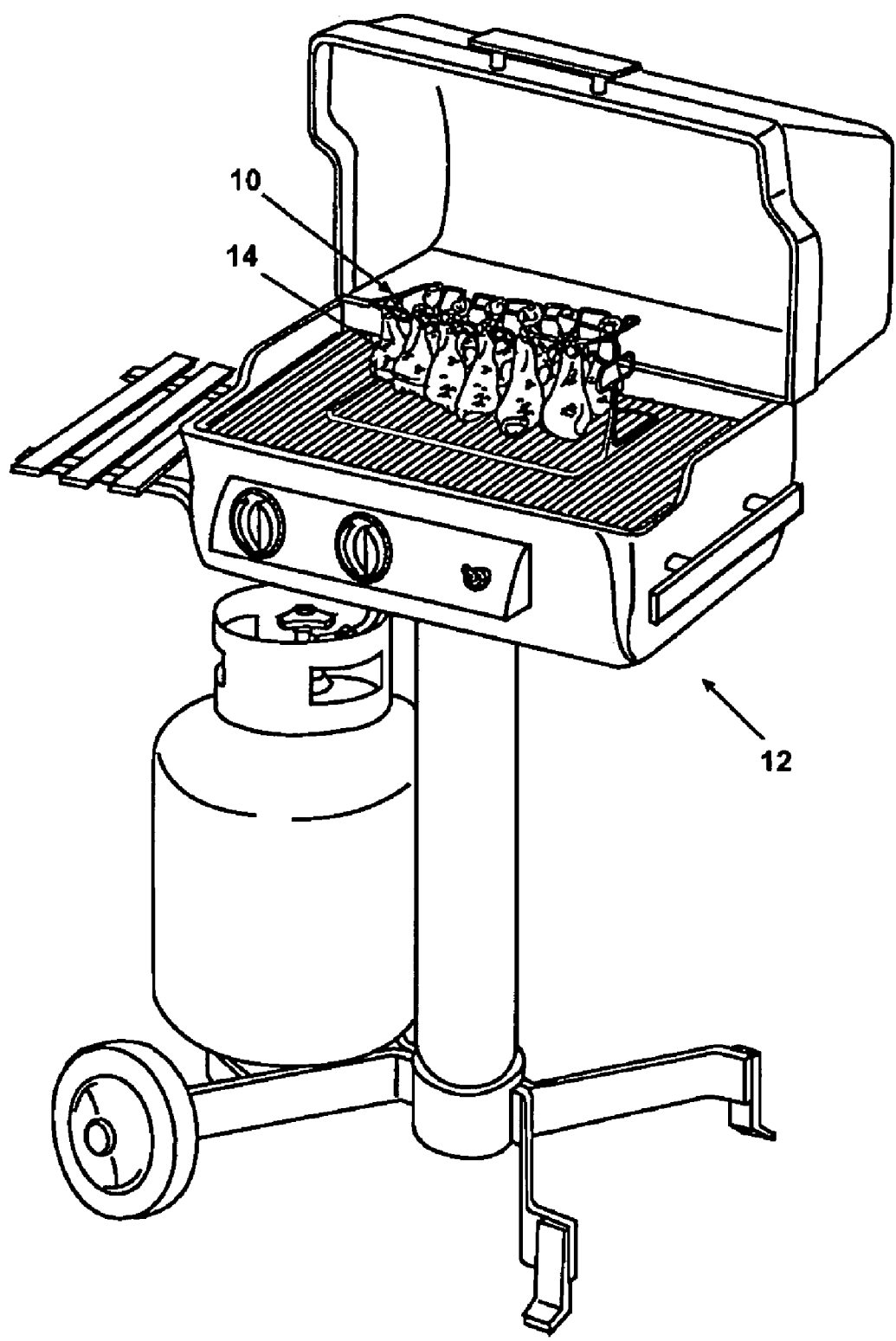
FIG. 1 is a perspective view of an open-frame grill supporting a first embodiment of a cooking support frame according to the invention for cooking food items.

Referring to the Figures, and in particular to FIGS. 1-6, a first embodiment of a cooking support frame 10 according to the invention is illustrated supported on a conventional gas or wood-fired grill 12, and selectively supporting a plurality of poultry legs 14 and poultry wings 18. In a preferred embodiment, the cooking support frame 10 is fabricated of a suitable, heat-resistant wire, such as stainless or nickel-plated steel, which is bent into a complex shape comprising an open base 20, a pair of uprights 22, a center hanger 24, and a hanger assembly 26. Several embodiments of the cooking support frame are described and illustrated herein, all of which are illustrated as fabricated of heat-resistant wire. As well, several embodiments share common elements and, thus, like elements are identified with like numerals. Although the embodiments of the cooking support frame are illustrated and described generally with reference to grilling over a gas or wood-fired grill, the cooking support frame can be readily used to suspend food items for baking or roasting in a conventional kitchen oven.

Figure 2:
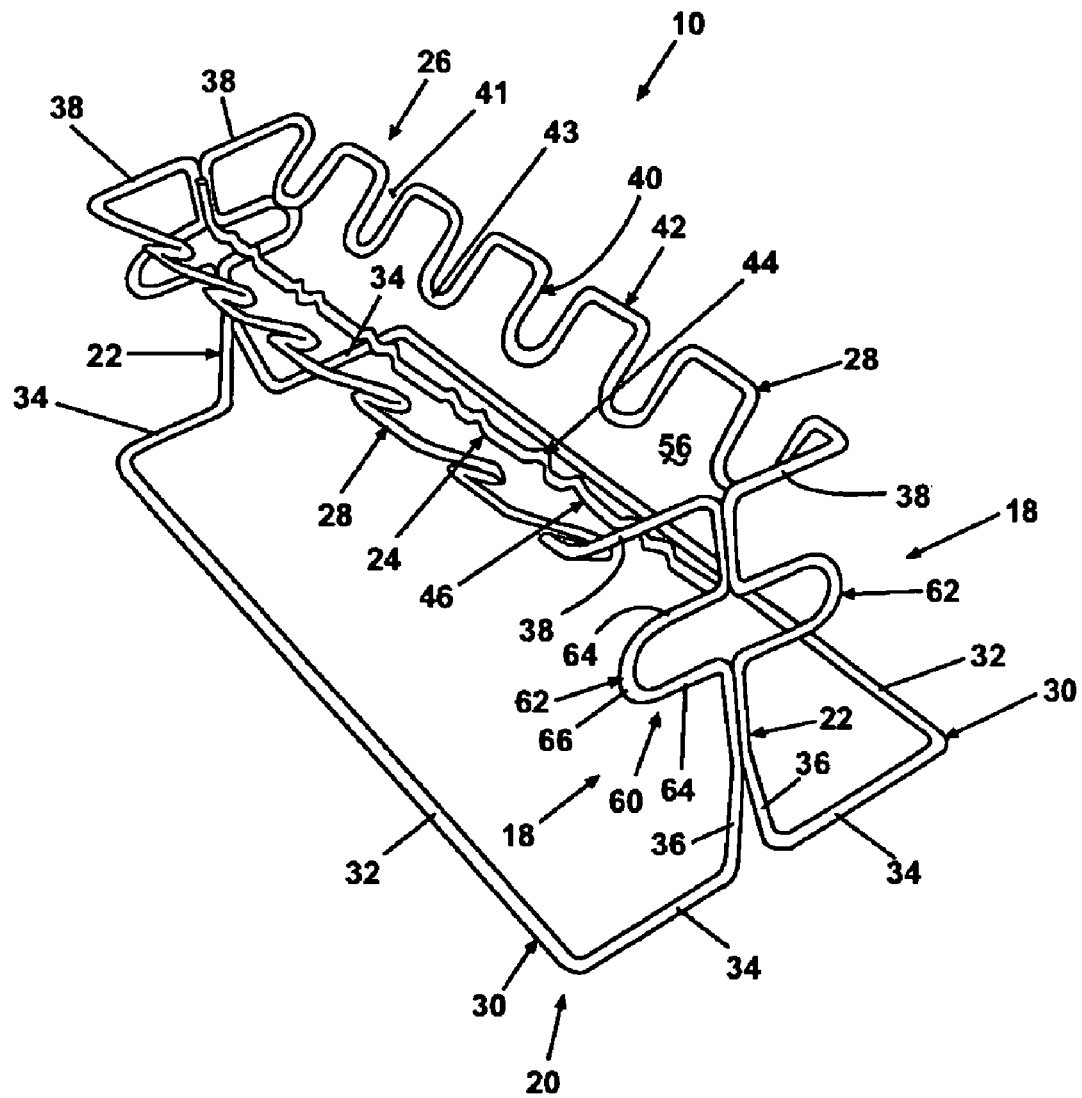
FIG. 2 is a perspective view of the cooking support frame illustrated in FIG. 1.

As illustrated in FIG. 2, the cooking support frame 10 preferably comprises a pair of identical support frame subassemblies 18. Each subassembly 18 comprises a base section 30, a vertical member 36, and a lateral hanger 28. The base section 30 comprises an elongate longitudinal member 32 transitioning orthogonally at each end into a pair of elongate transverse members 34 in planar relationship therewith. Each transverse member 34 transitions generally orthogonally into an elongate vertical member 36 to extend orthogonal to the plane defined by the longitudinal member 32 and the transverse members 34. Each vertical member 36 transitions at its upper end into an elongate lateral member 38 extending toward the longitudinal member 32 parallel to the transverse member 34.

As illustrated in FIG. 2, the vertical member 36 can extend some preselected distance at an angle from the transverse member 34 before transitioning to a vertical orientation at an upper portion. Alternatively, the vertical member 36 can extend orthogonally from the transverse member 34 over its full length. Additionally, the vertical member 36 can be selectively formed with an elongated, oval-shaped handle portion 62 comprising a pair of elongate, parallel, spaced-apart straight portions 64 extending orthogonally from the vertical member 36 and joined at a bight portion 66.

Figure 3:
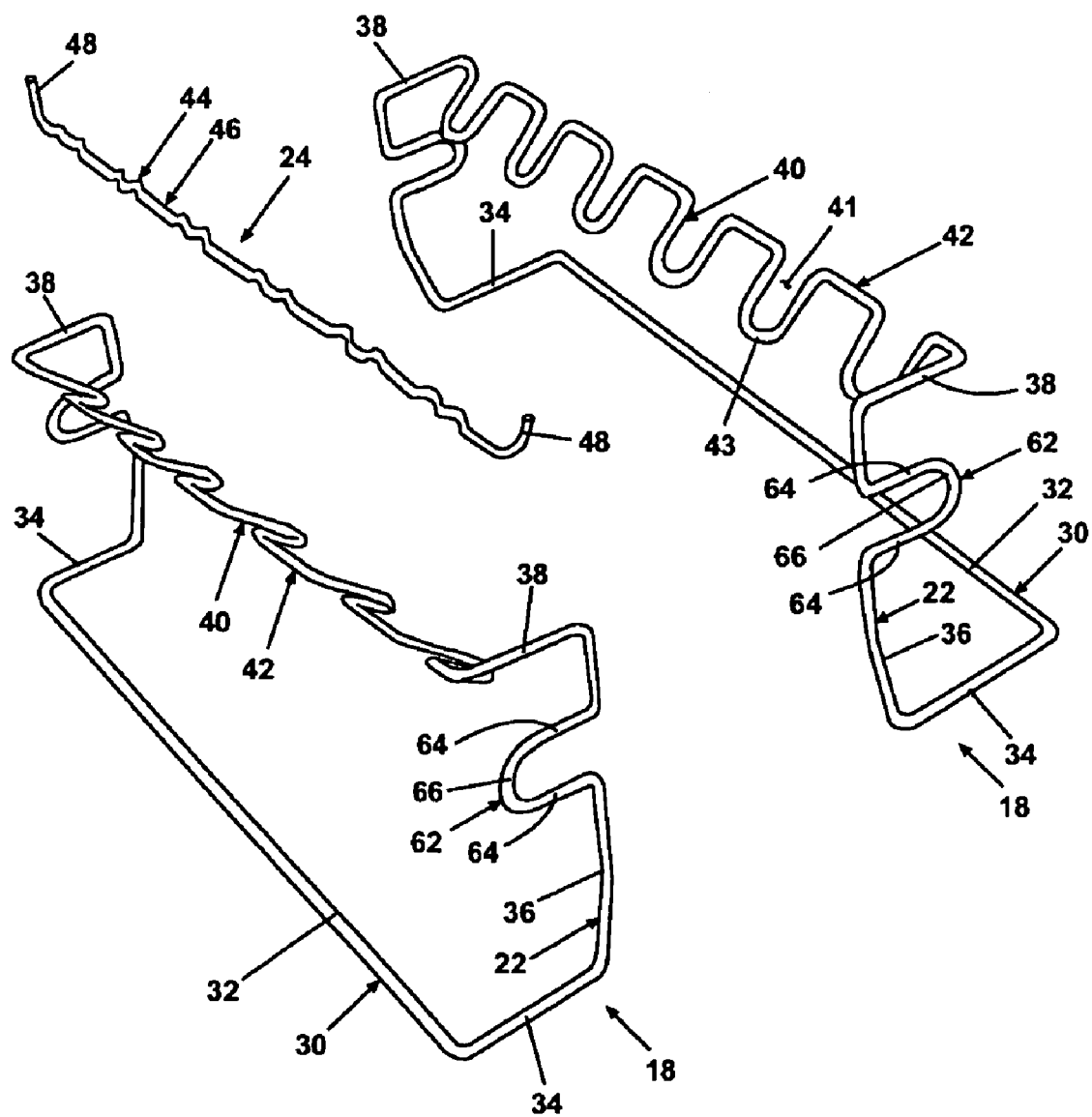
FIG. 3 is an exploded view of the cooking support frame illustrated in FIG. 1.
Figure 4:
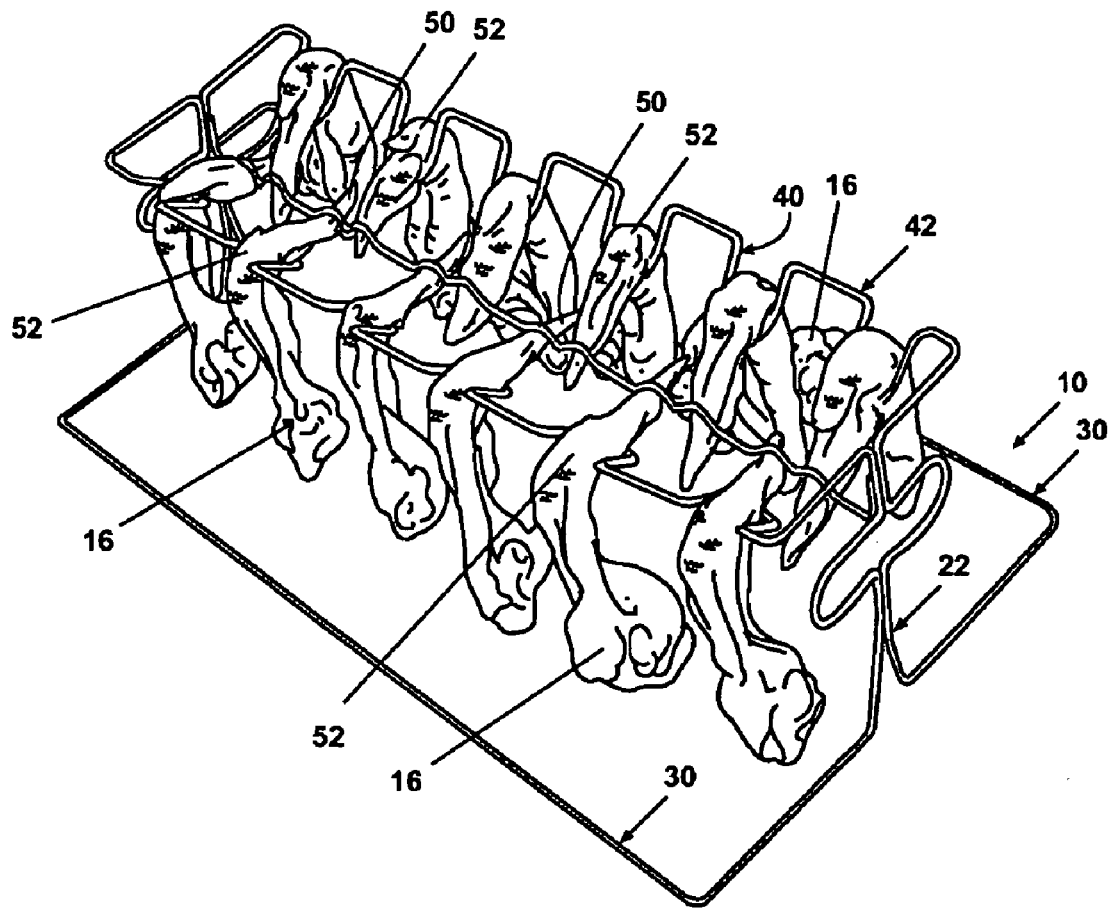
FIG. 4 is a perspective view of the cooking support frame illustrated in FIG. 1 holding a plurality of poultry wings for cooking on a grill.
Figure 5:
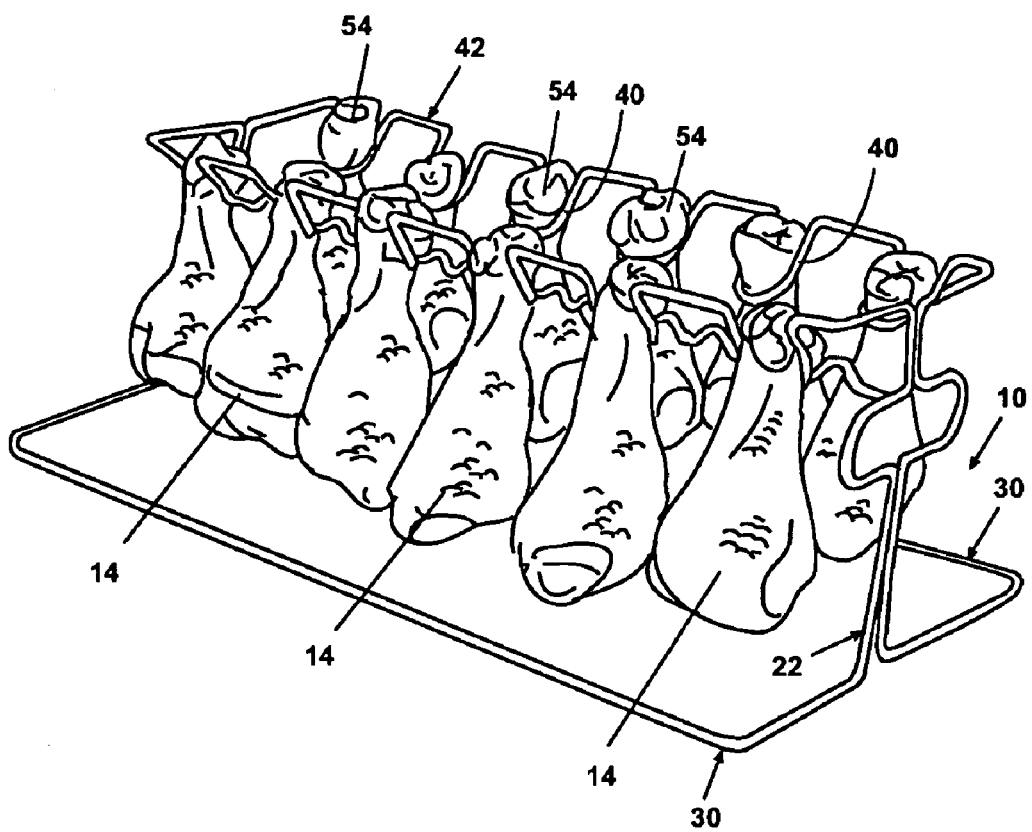
FIG. 5 is a perspective view of the cooking support frame illustrated in FIG. 1 holding a plurality of poultry legs for cooking on a grill.

The lateral hanger 28 is an elongate member extending from the lateral members 38 generally parallel to the longitudinal member 32 and offset laterally from the vertical member 36. As best seen in FIG. 3, the lateral hanger 28 comprises a regular series of alternating, arcuate, generally U-shaped cradles 40 and bridges 42. The cradles 40 are in a parallel, planar arrangement along the lateral hanger 28. The cradles 40 have an open end 41 and a closed end 43, with a width adapted to receive a poultry wing 16 or leg 14, as illustrated in FIGS. 4 and 5. The cradles 40 receive the carpal joint 52 of the poultry wing 16 (FIG. 4), and the poultry leg 14 immediately adjacent the ankle joint 54 (also referred to as the "knuckle") (FIG. 5). The length of the bridge 42 is preferably selected so that poultry wings 16 and legs 14 suspended from the cradles 40 will be spaced sufficiently apart for thorough browning and cooking. The cradles 40 open upwardly and are inclined inwardly with the closed end 43 oriented toward the medial plane of the assembled frame 10.

The center hanger 24 is an elongate member comprising a regular series of alternating, arcuate, generally U-shaped cradles 44 and bridges 46. The cradles 44 are in a parallel, planar arrangement along the center hanger 24, open downwardly, and are sized to accommodate the tip 50 of a poultry wing 16, as shown in FIG. 4. The center hanger 24 transitions orthogonally at each end to an elongate leg 48 coplanar with the cradles 44.

Figure 6:
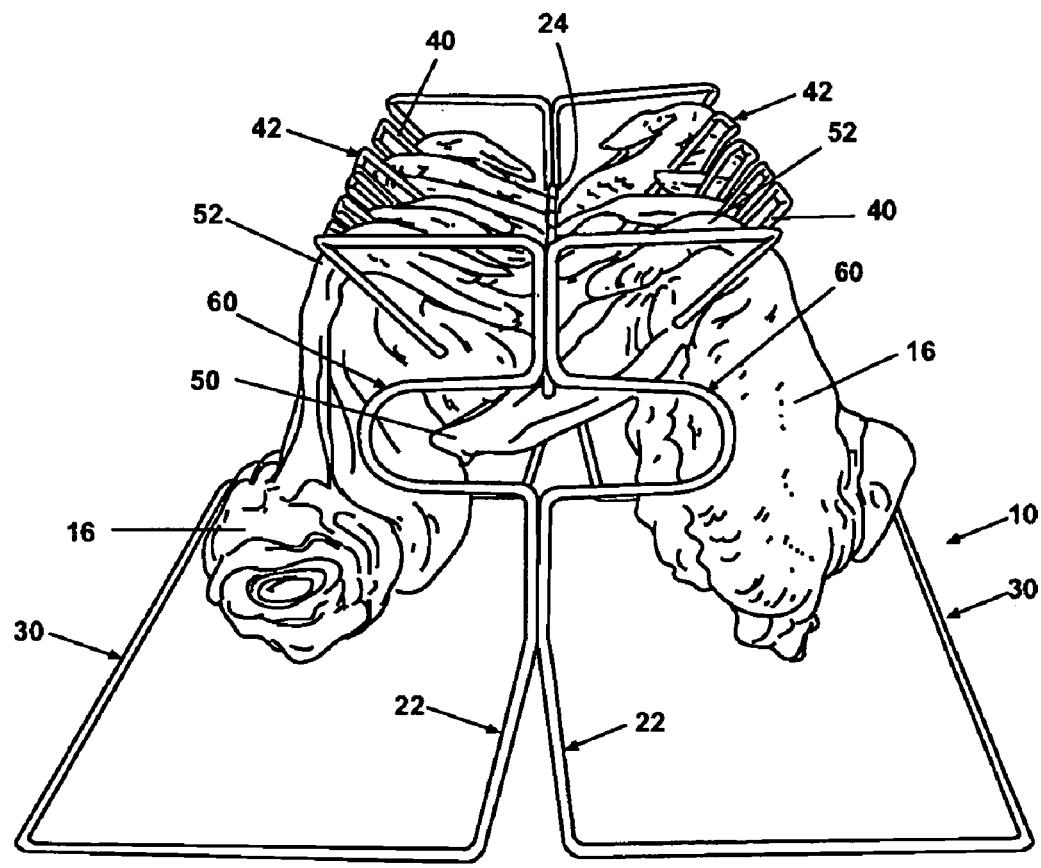
FIG. 6 is an end elevation view of the cooking support frame and poultry wings illustrated in FIG. 4.

The frame 10 is assembled by joining a pair of support frame subassemblies 18 rigidly together in opposed, complementary relationship. The subassemblies 18 are joined along the vertical members 36, i.e. along the medial plane defined by the longitudinal axis of each upright 22, in a suitable, well-known manner, such as welding, soldering or brazing, an adhesive, clamping bands, or the like, to form the uprights 22. The center hanger 24 can be attached to the assembled uprights 22 by joining the legs 48 to the uprights 22 using a similar method so that the cradles 44 open downwardly. In the assembled frame 10, the cradles 40 extend generally toward the center hanger 24 (FIG. 6). The conjoined subassemblies 18 define a hanger assembly 26 comprising the lateral hangers 28 that, with the center hanger 24, define a basket 56 for holding larger food items, such as vegetables, fish, lobster tails, ears of corn, bread, and the like. The open base 20 enables heat to be delivered uninterrupted from a heat source to food items supported or suspended from the frame 10.

It will be evident to a person having an ordinary level of skill in the relevant art that the frame 10 can be fabricated by selecting, forming, and interconnecting suitable elements other than the subassemblies 18 and the center hanger 24 in different ways. It should be understood that the embodiments illustrated in FIGS. 1-5 and elsewhere herein are exemplary only and should not be considered limiting except where otherwise indicated.

The configuration and relative alignment of the cradles 44 of the center hanger 24 and the cradles 40 of the lateral hangers 28 can be selected with either of two configurations. In a preferred embodiment, the cradles 44 of the center hanger 24 are formed so that they are aligned collaterally with the cradles 40 of the lateral hangers 28. Alternatively, the cradles 44 of the center hanger 24 can be formed so that they are offset collaterally with the cradles 40 of the lateral hangers 28.

Figure 22:
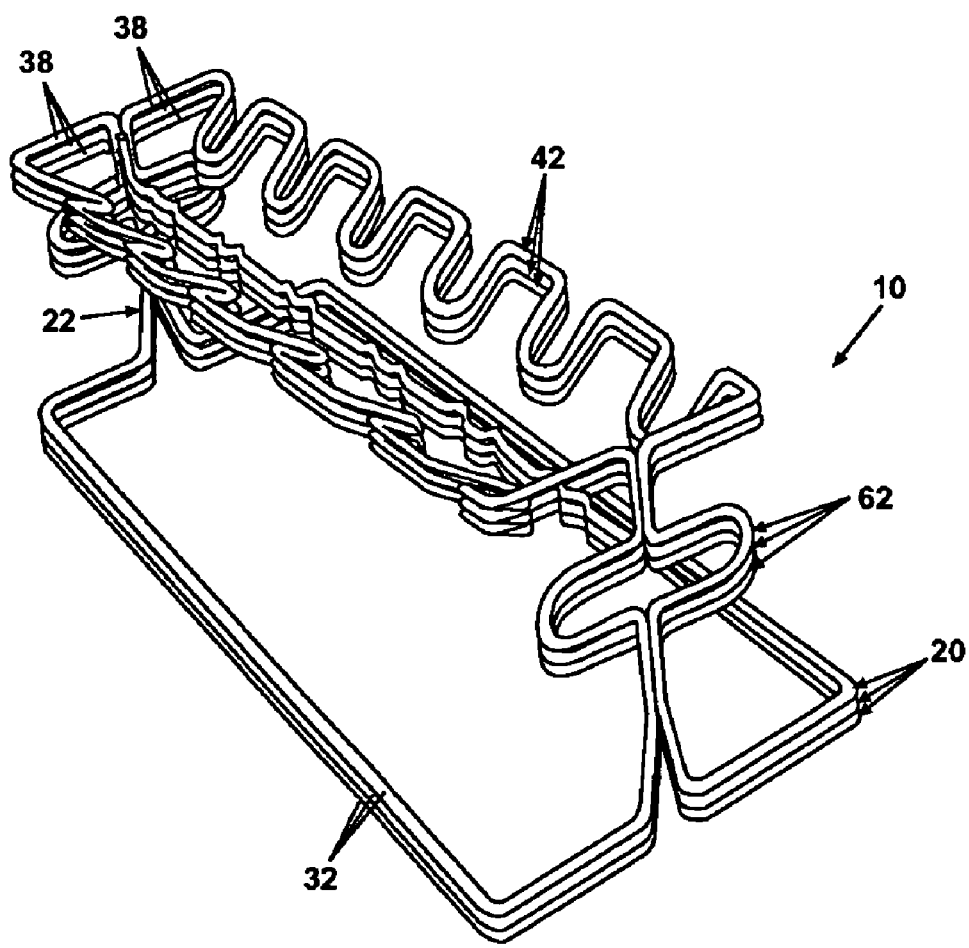
FIG. 22 is a perspective view of a plurality of the cooking support frames illustrated in FIG. 2 oriented in a stackable relationship.

The vertical members 36 can be inclined somewhat toward each other from the base 20 to facilitate nesting several frames 10 together. As illustrated in FIG. 22, a plurality of cooking support frames 10 can be stacked together in a compact, nested relationship for packaging, shipping, and displaying. This enables a large number of frames 10 to be handled with minimal space required.

Referring to FIGS. 4-6, a poultry wing 16 can be suspended from the cooking support frame 10 by suspending the wing 16 on the cradle 40 at the carpal joint 52 with the wing tip 50 inserted into the cradle 44 so that the meaty portion of the wing 16 is suspended from the lateral hanger 28 along the outer periphery of the cooking support frame 10. The weight of the wing 16 will tend to force the wing tip 50 upwardly into the cradle 44, thereby "locking" the wing 16 in position.

Poultry legs 14 can be suspended from the cooking support frame 10 by suspending the leg 14 from the cradle 40 by slidably inserting the lower leg into the cradle 40 so that the knuckle 54 is supported by the cradle 40 and the meaty portion of the leg 14 is suspended downwardly. The downward inclination of the cradles 40 securely retains the legs 14 in the cradles 40 during cooking. Legs 14 and wings 16 can both be suspended from the cooking support frame 10 by arranging the pieces appropriately in accordance with the previously-described procedures.

Other food items can be supported in the basket 56 with or without poultry legs 14 or wings 16. The basket 56 has a sufficiently closed bottom to support food items such as whole or filleted fish, ears of corn, potatoes, tomatoes, loaves of bread, lobster tails, and the like. Food items can be placed longitudinally in the basket (whole or filleted fish, bread) or transversely across the basket (potatoes, ears of corn). If poultry wings are being cooked, the row of interspersed wing ends will enhance the support capability of the basket bottom. Finally, cooking of vegetables and other food items having a relatively high moisture content will provide basting of poultry pieces suspended from the hanger assembly 26, thereby adding flavor and moisture to the poultry pieces.

The meaty portions of the wings 16 and the legs 14 are suspended vertically and do not touch the base cooking surface, thereby reducing the risk of charring or overcooking, and enabling the pieces to "self-baste" during the cooking process. The vertical orientation of the legs 14 and wings 16 on the frame 10 positions the meatier portions of the pieces 14, 16 toward the heat source, and the thinner portions away from the heat source, thereby contributing to more uniform cooking. Finally, the unique design of identical subassemblies 18 attached back-to-back to form the cooking support frame 10 greatly reduces production costs.

Figure 7:
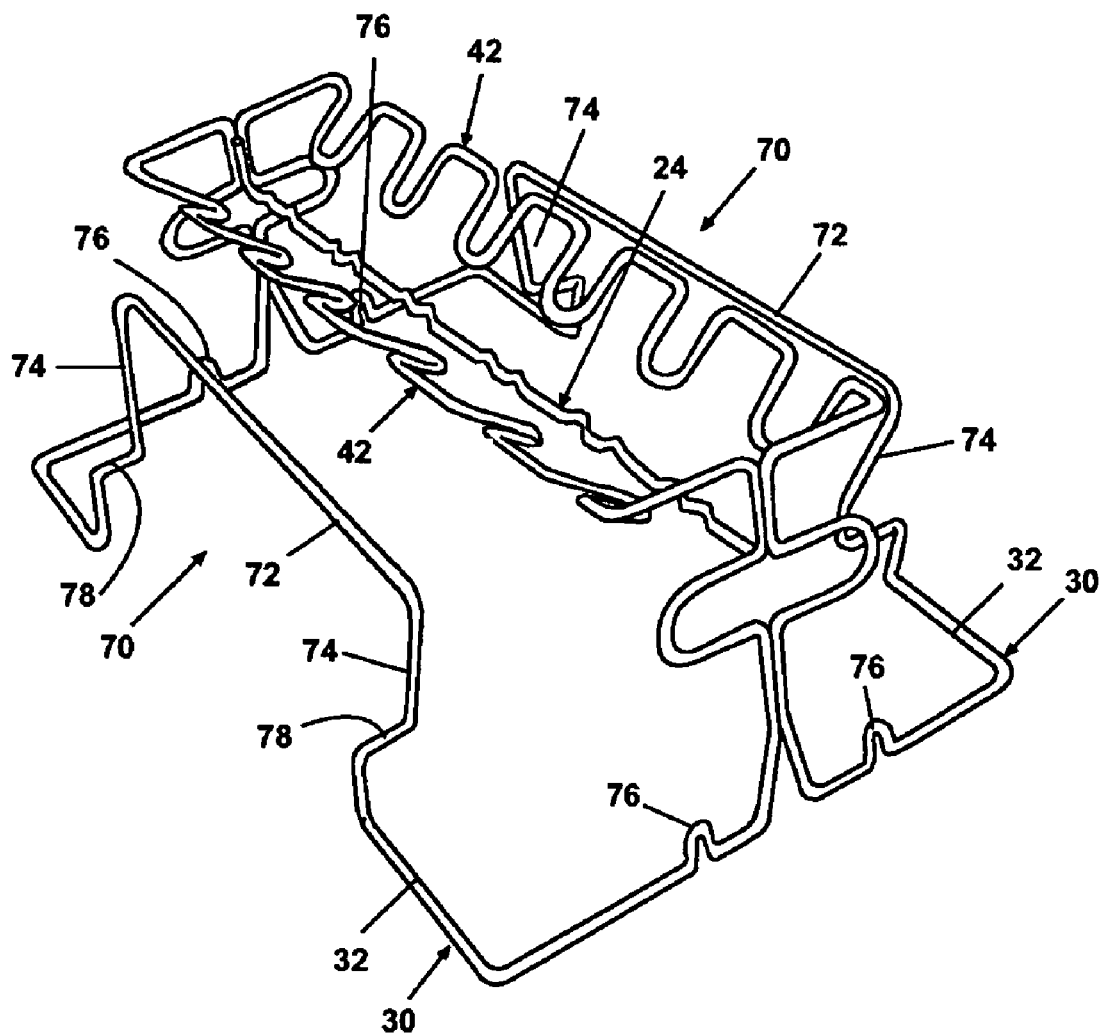
FIG. 7 is a perspective view of a second embodiment of a cooking support frame according to the invention for cooking chicken wings and/or chicken legs and comprising a pair of rib supports for cooking a rack of ribs.
Figure 9:
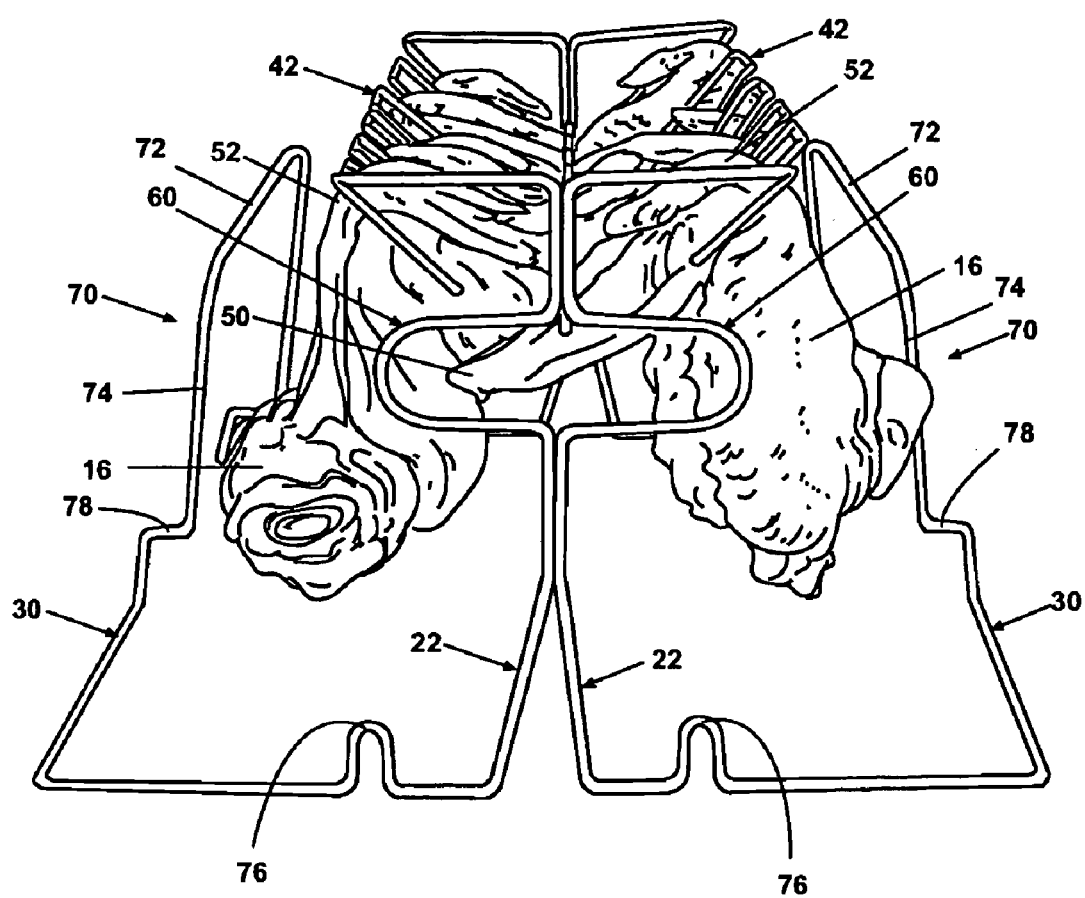
FIG. 9 is an end elevation view of the cooking support frame illustrated in FIG. 7 holding a plurality of poultry wings for cooking on a grill.
Figure 10:
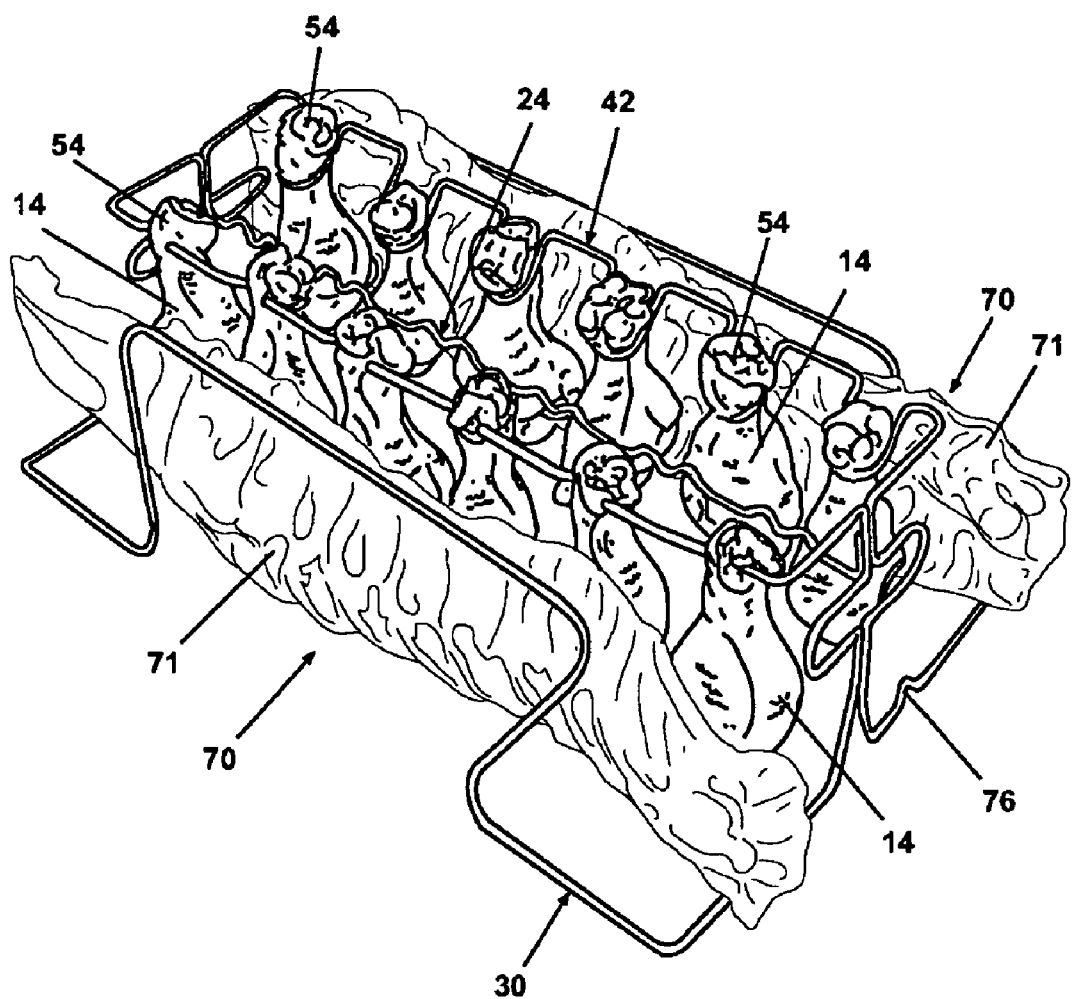
FIG. 10 is a perspective view of the cooking support frame illustrated in FIG. 7 holding a plurality of poultry legs and pork ribs.

Referring now to FIGS. 7, 9, and 10, a second embodiment of the cooking support frame 10 is illustrated which is identical to the embodiment illustrated in FIGS. 1-6, except that the longitudinal members 32 transition at an intermediate portion to a pair of rib supports 70, each comprising a pair of parallel, spaced-apart vertical members 74 and a cross member 72 extending therebetween parallel to the longitudinal member 32. Each cross member 72 is parallel to and intermediate the longitudinal member 30 and the lateral hanger 28, so that the rib support 70 can support a variety of food items length-wise along the outer perimeter of the lateral hangers 28, such as a rack of ribs 71, one or more ears of corn, and the like (FIG. 10). Each transverse member 34 is provided with a "crimp" intermediate the longitudinal member 32 and the vertical member 36 to form a rib stop 76 to assist in preventing the lower edge of the rack of ribs 71 from moving laterally along the transverse member 34. The rib supports 70 can be inclined somewhat toward each other from the base 20, as illustrated in FIG. 9, to facilitate nesting several frames 10 together.

The rack of ribs 71 is inserted between the rib support 70 and the hanger assembly 26 with an upper portion of the rack of ribs 71 bearing against the rib support 70 and the lower edge supported on the transverse member 34, against the rib stop 76 as necessary. These additional food items can be grilled separately, or in combination with poultry legs and wings suspended from the hanger assembly 26, or other food items supported in the basket 56, as previously described.

Figure 8:
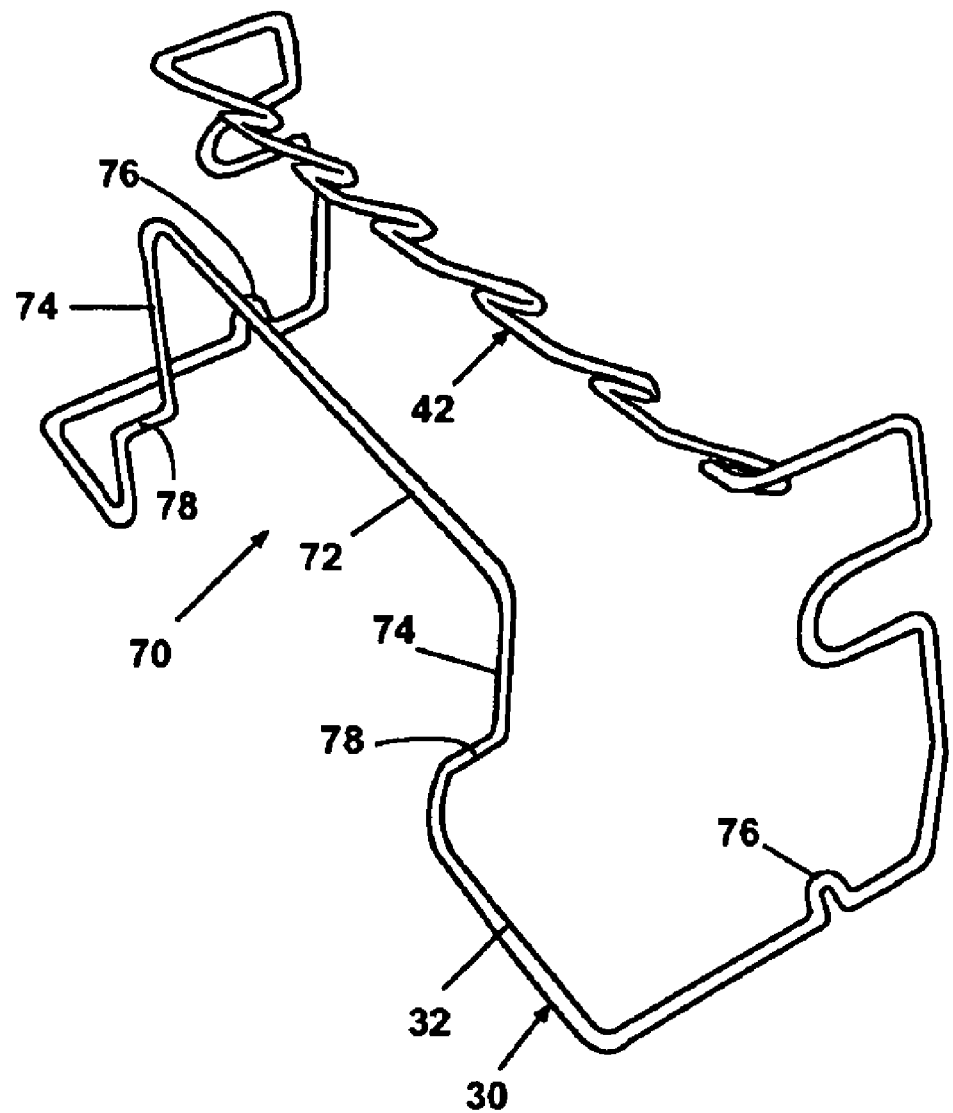
FIG. 8 is a close-up perspective view of a third embodiment of a cooking support frame according to the invention illustrating an alternate rib support.

FIG. 8 illustrates a third embodiment of the cooking support frame which is identical to the embodiment illustrated in FIGS. 7, 9, and 10, except that the vertical member 74 is formed with an inwardly-extending offset member 78 to support a rack of ribs 71 above the cooking surface along the outside of the rib support 70. This provides for easier placement of the rack of ribs 71 on the frame 10, and, with ribs supported along the inside of the rib support 70 as described above, enables twice the amount of ribs to be cooked.

Figure 11:
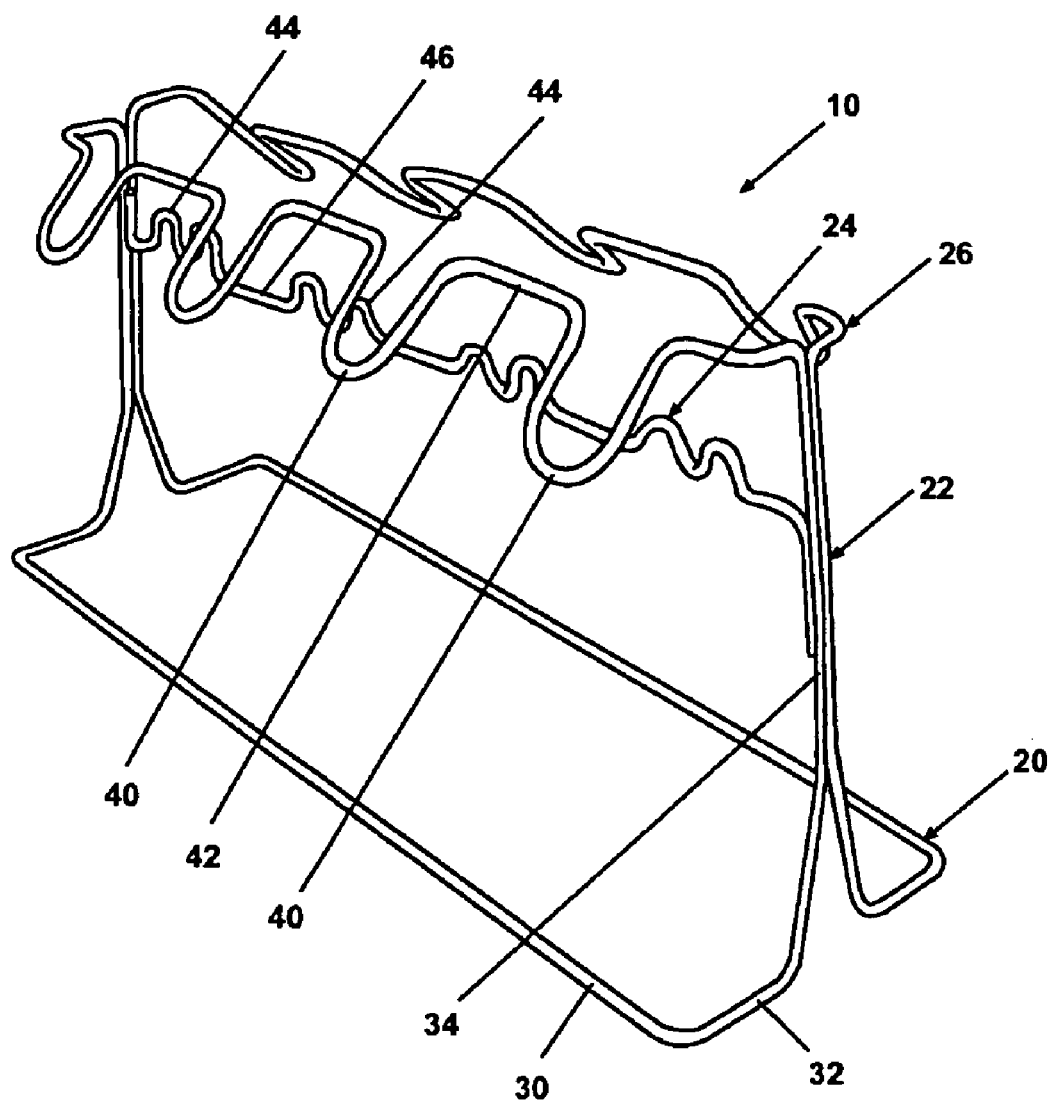
FIG. 11 is a perspective view of a fourth embodiment of a cooking support frame according to the invention.
Figure 12:
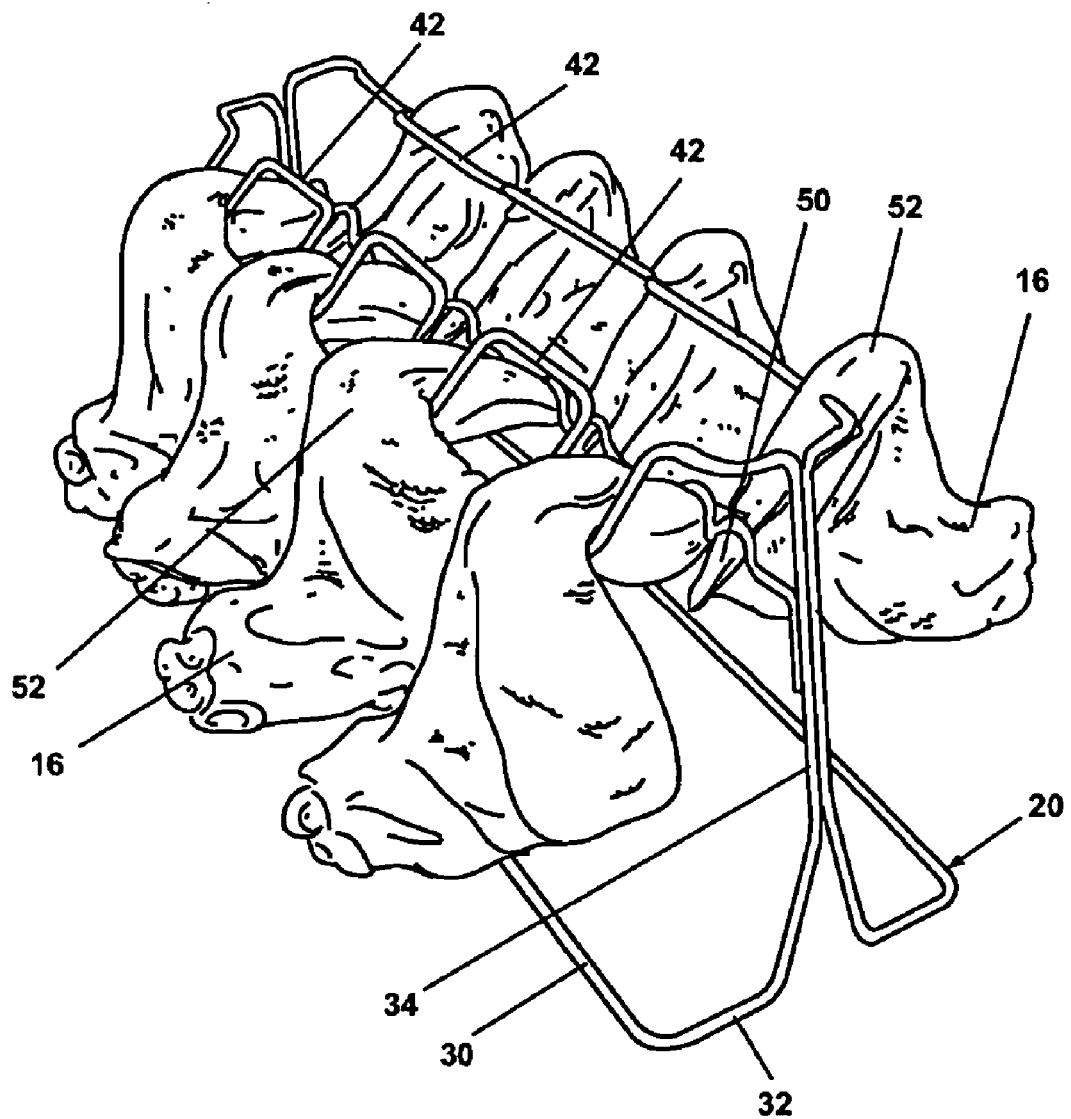
FIG. 12 is a perspective view of the cooking support frame illustrated in FIG. 11 holding a plurality of poultry wings for cooking on a grill.
Figure 13:
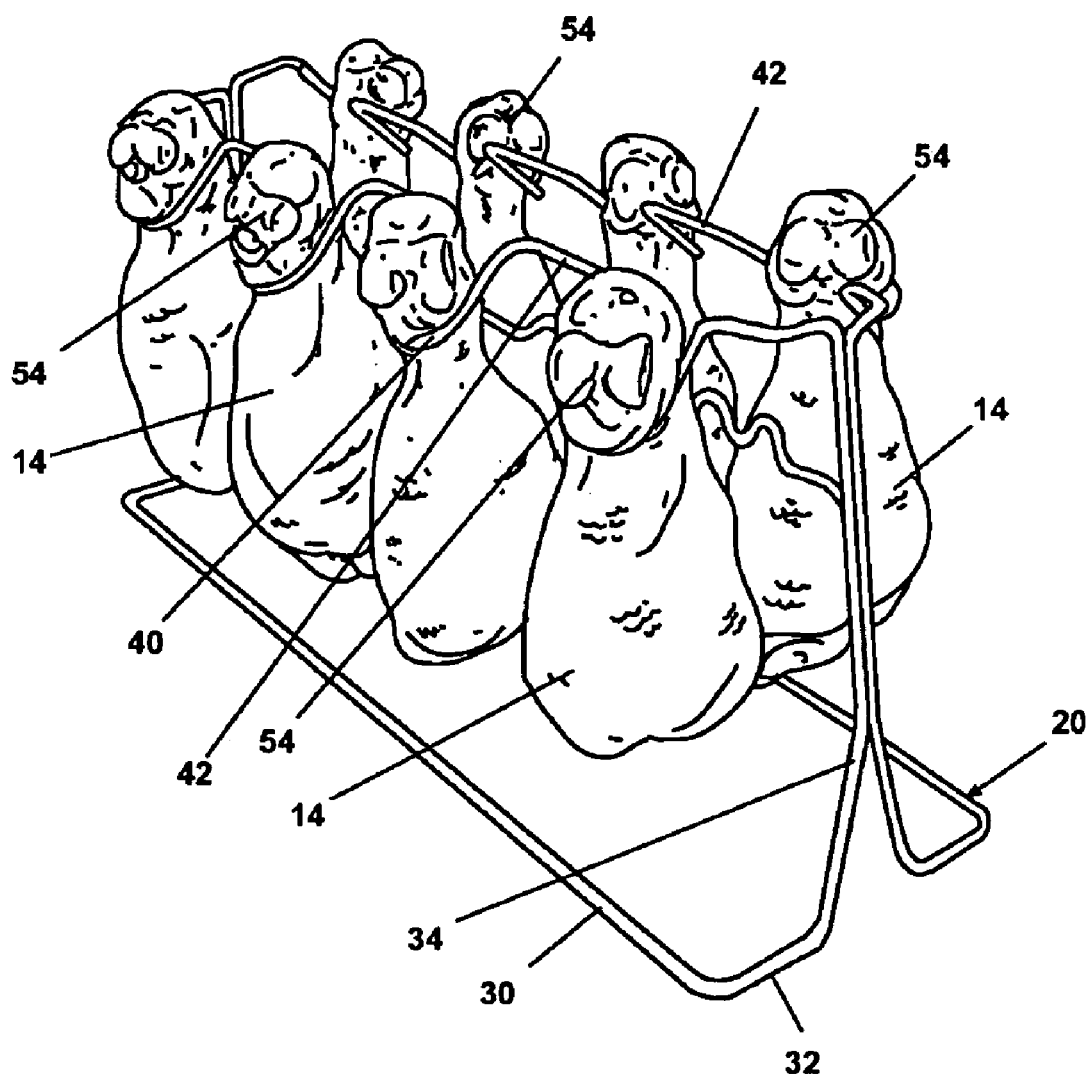
FIG. 13 is a perspective view of the cooking support frame illustrated in FIG. 11 holding a plurality of poultry legs for cooking on a grill.

FIGS. 11-13 illustrate a fourth embodiment of the cooking support frame which is identical to the embodiment illustrated in FIGS. 1-6, except that the cradles 44 are inclined outwardly rather than inwardly. This embodiment presents a somewhat narrower profile of the frame 10 where space may be a consideration, such as with smaller grills.

Figure 14:
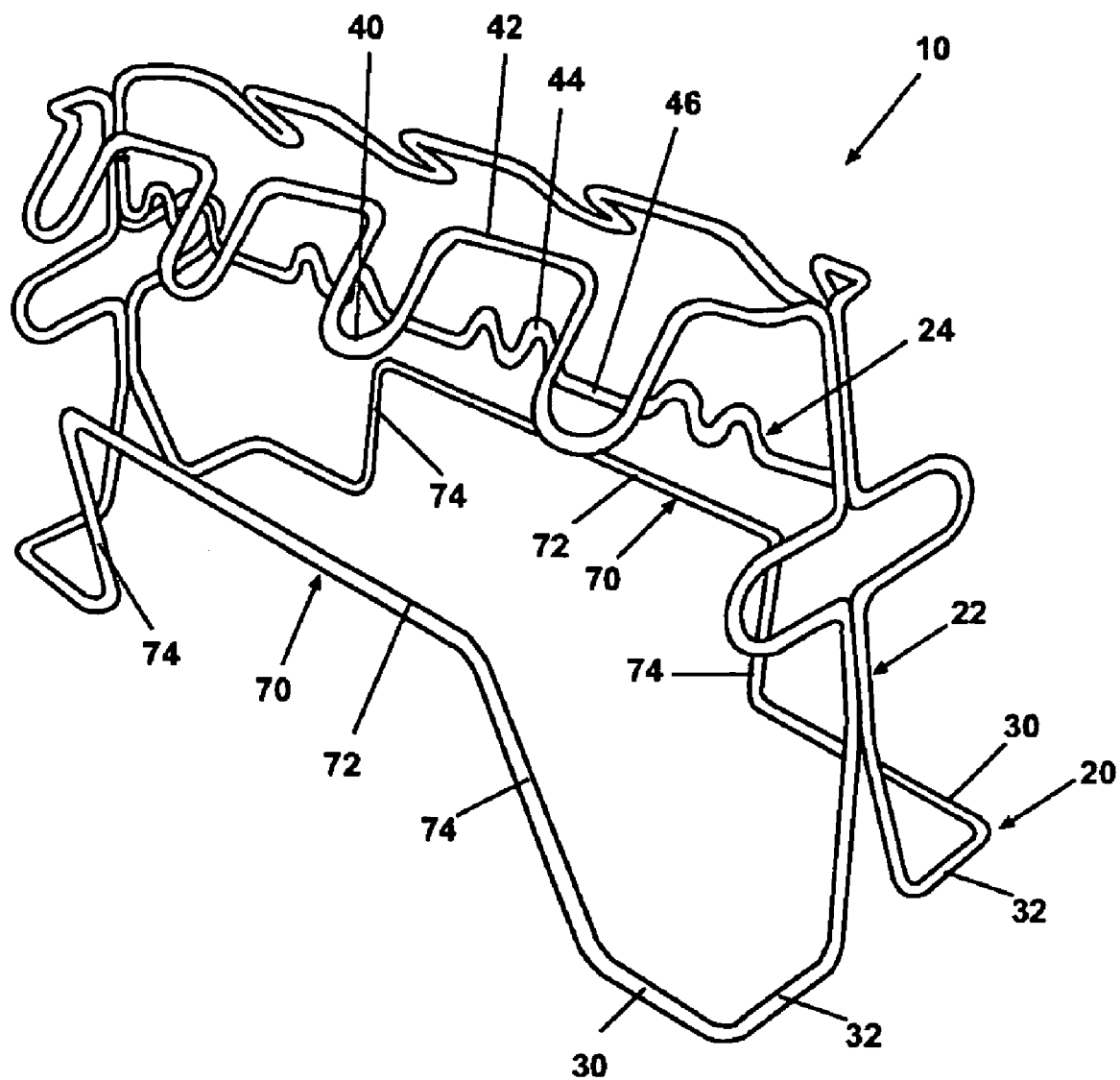
FIG. 14 is a perspective view of a fifth embodiment of a cooking support frame according to the invention.

FIG. 14 illustrates a fifth embodiment of the cooking support frame which is identical to the embodiment illustrated in FIGS. 11-13 except that the frame is provided with rib supports 70 as previously described and illustrated.

Figure 15:
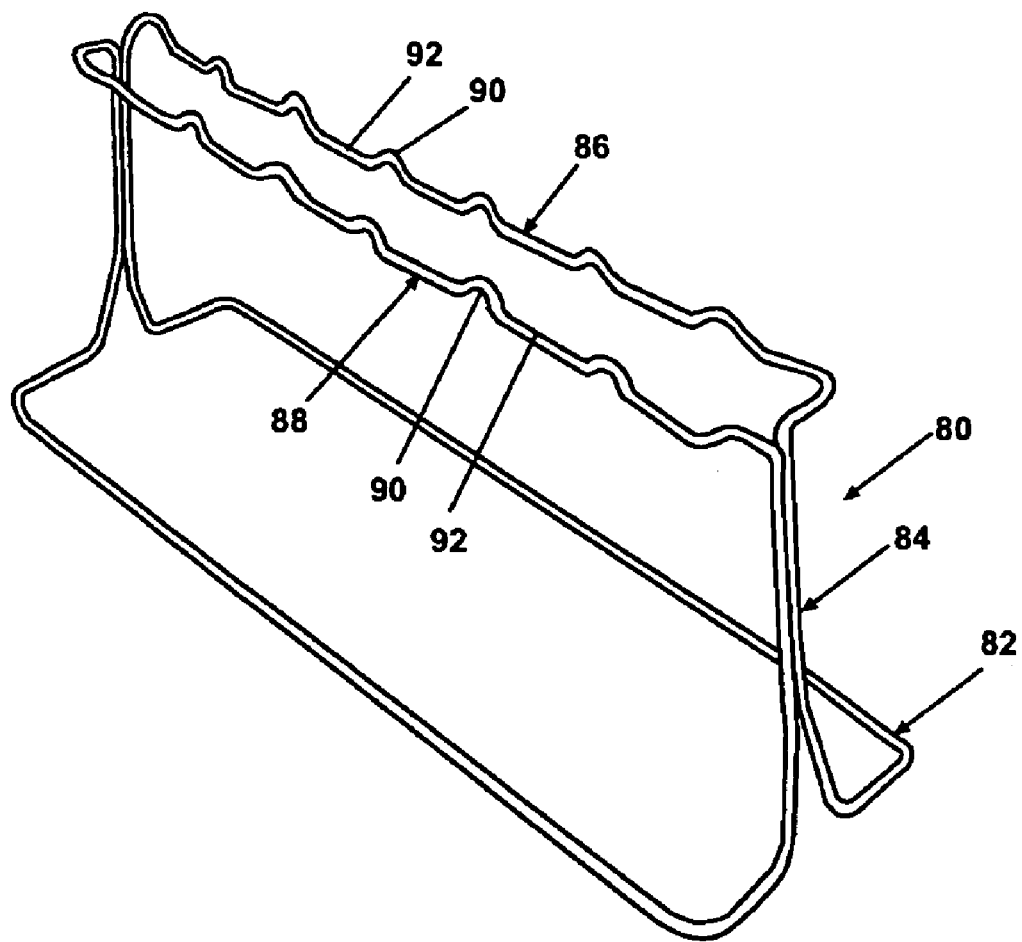
FIG. 15 is a perspective view of a sixth embodiment of a cooking support frame according to the invention.

FIG. 15 illustrates a sixth embodiment of a cooking support frame 80 comprising a base portion 82 and a pair of uprights 84 substantially similar to the base 20 and the uprights 22 previously described and used for cooking poultry wings 16. A pair of lateral hangers 86, 88 extends horizontally between the uprights 84 in parallel, spaced-apart juxtaposition. Each lateral hanger 86, 88 comprises an elongate member having alternating, regularly-spaced, arcuate, generally U-shaped tip cradles 90 and linear bridges 92. The tip cradles 90 open in a downward direction, and are sized to accommodate the tip of a poultry wing 16. Preferably, the frame 80 is comprised of two identical subassemblies joined rigidly together in opposed, complementary relationship in general accordance with the previously-described assembly procedure. The subassemblies are connected along the vertical members in a suitable, well-known manner, such as welding, soldering or brazing, an adhesive, clamping bands, or the like, to form the uprights 84.

Figure 16:
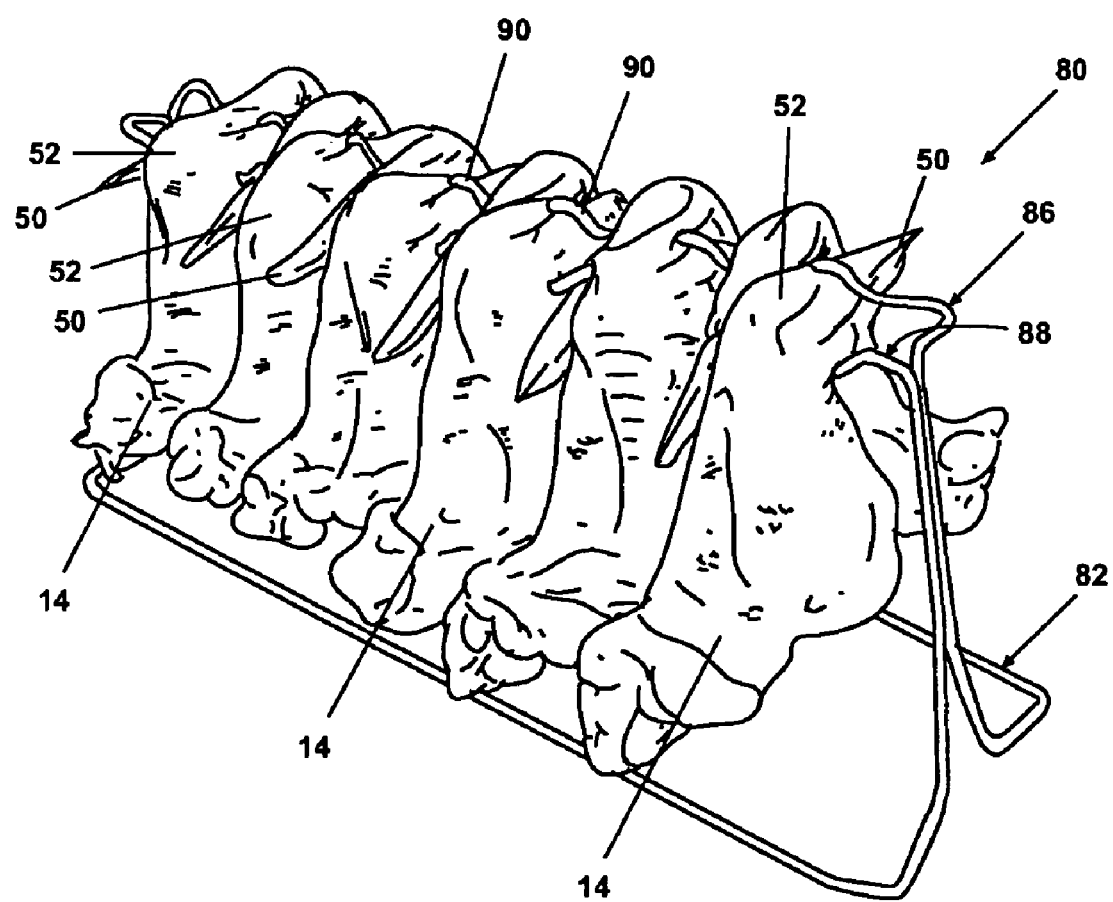
FIG. 16 is a perspective view of the cooking support frame illustrated in FIG. 15 holding a plurality of poultry wings for cooking on a grill.

Referring to FIG. 16, a poultry wing 16 is suspended from the cooking support frame 80 by inserting the wing tip 50 into the tip cradle 90 of a first lateral hanger 86 with the portion of the wing 16 intermediate the wing tip 50 and the carpal joint 52 resting on a laterally opposed bridge 92 of a second lateral hanger 88 so that the meaty portion of the wing 16 is suspended downwardly. The weight of the wing 16 will tend to force the wing tip 50 upwardly into the tip cradle 90, thereby "locking" the wing 16 in position.

Figure 17:
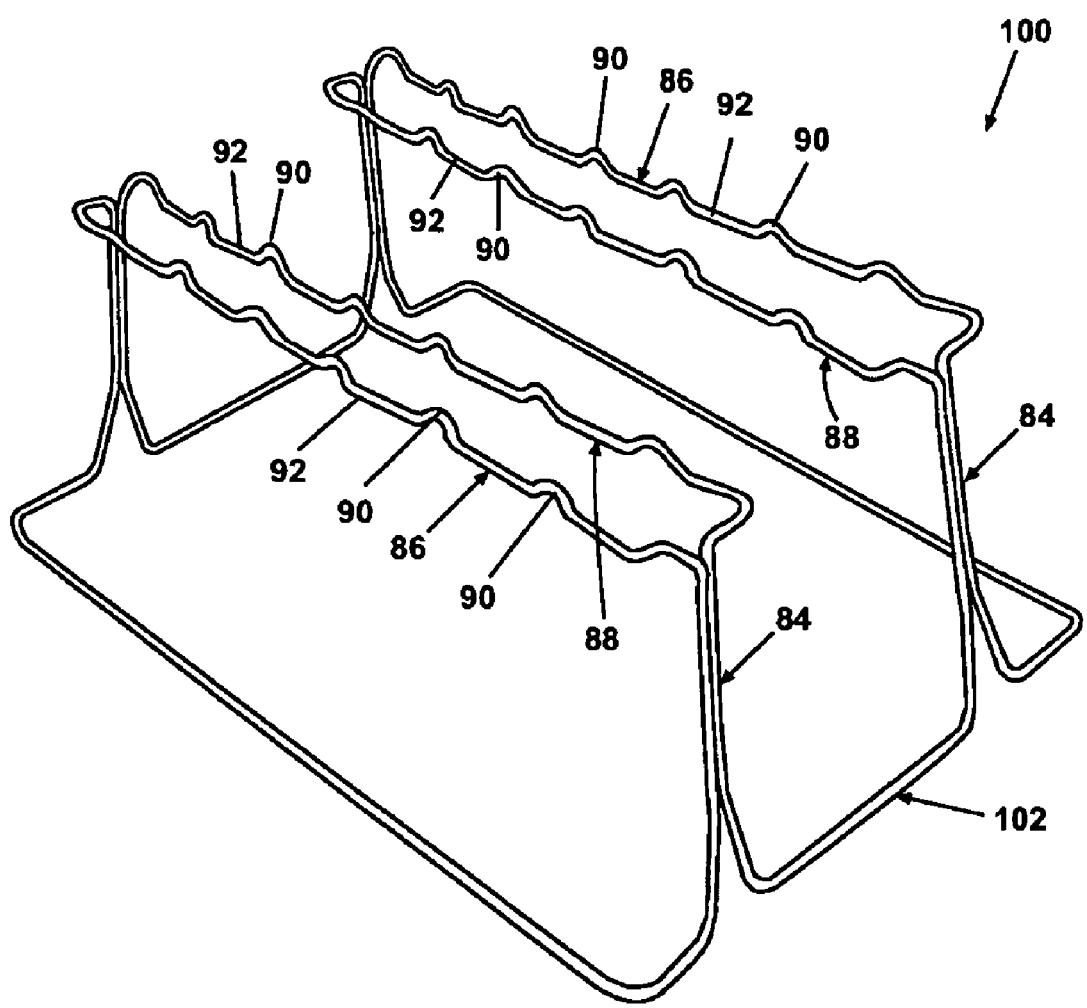
FIG. 17 is a perspective view of a seventh embodiment of a cooking support frame according to the invention

FIG. 17 illustrates a cooking support frame 100 which is essentially identical to the cooking support frame 80 except that the cooking support frame 100 is adapted to support approximately double the number of poultry wings 16. The cooking support frame 100 essentially comprises a pair of cooking support frames 80 having two pair of uprights 84 and lateral hangers 86, 88 extending from an enlarged base 102. Poultry wings 16 are suspended from the lateral hangers 86, 88 as previously described.

The cooking support frame 80 can be provided with handles 60 incorporated into the uprights 84 as previously described. A plurality of cooking support frames 80 can be stacked together in a compact, nested relationship for packaging, shipping, and displaying. Handles 60 can similarly be incorporated into the uprights 84 of the cooking support frame 100, which can also be stacked together for packaging, shipping, and displaying. The frames 80, 100 can also be provided with a pair of rib supports 70 as previously described.

Figure 18:
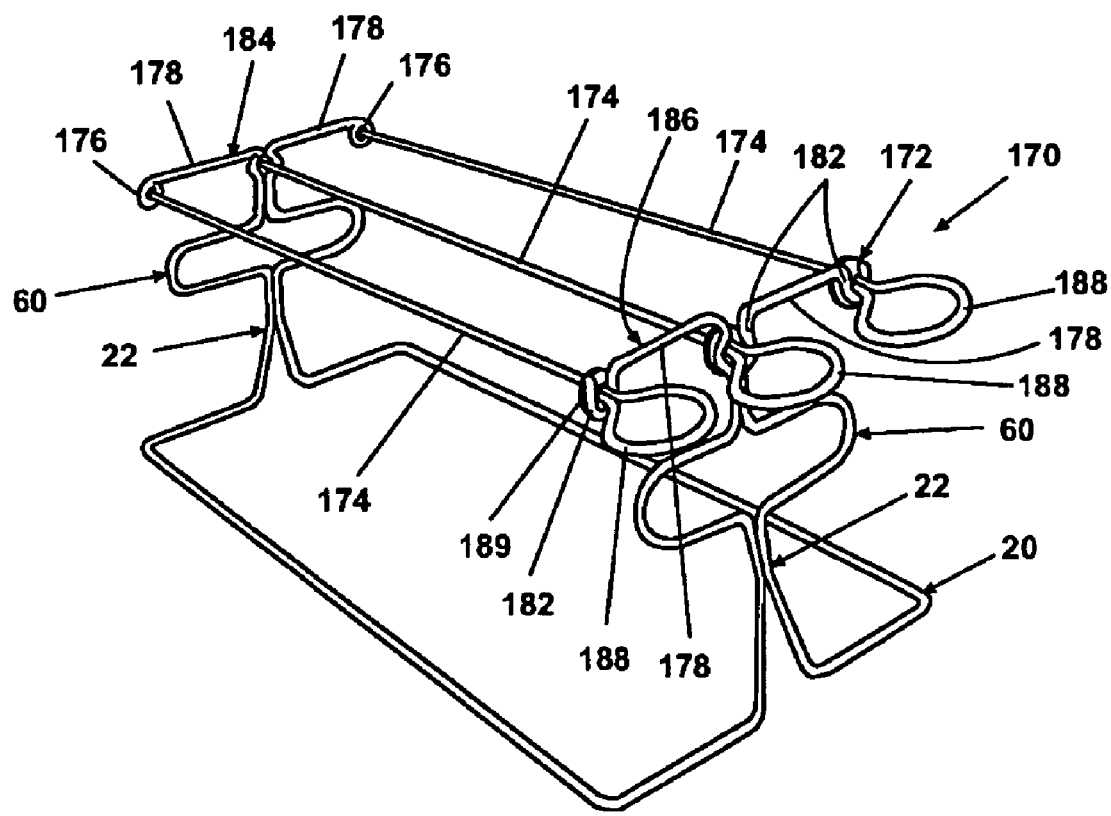
FIG. 18 is a perspective view of an eighth embodiment of a cooking support frame according to the invention for supporting food items on skewers.
Figure 19:
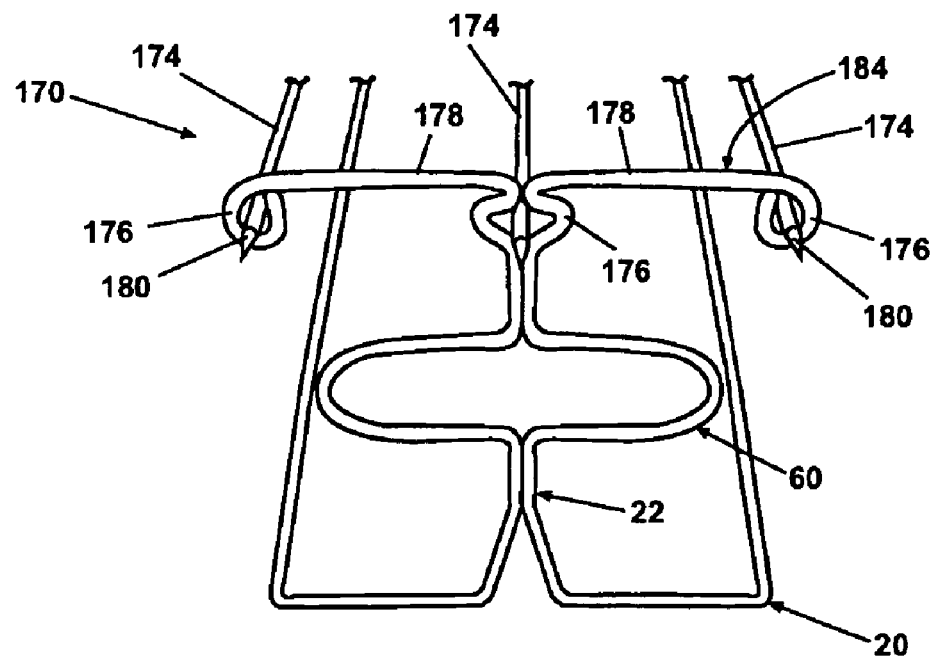
FIG. 19 is an enlarged perspective view of a first end of the cooking support frame illustrated in FIG. 18.
Figure 20:
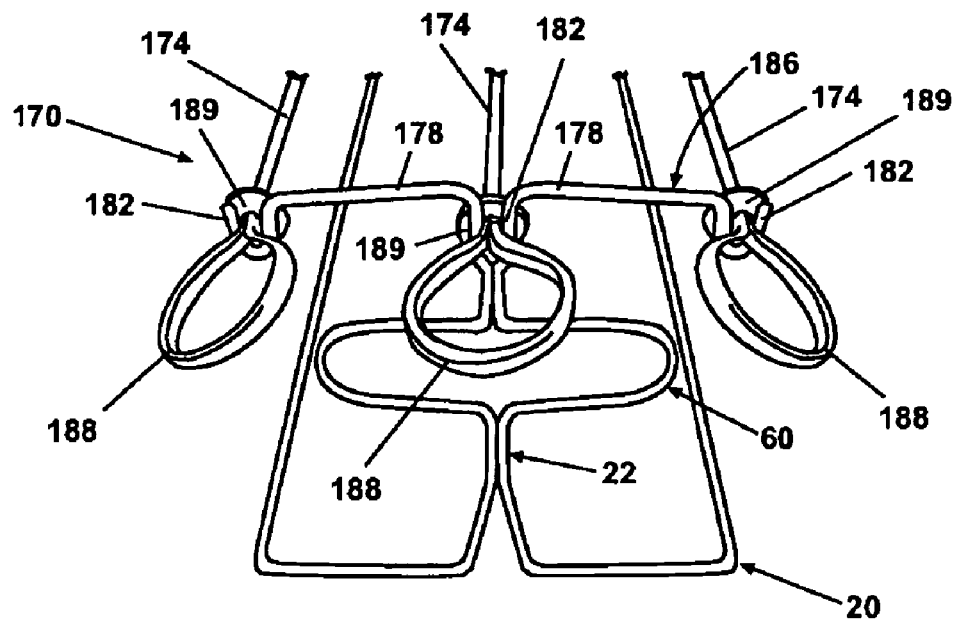
FIG. 20 is an enlarged perspective view of a second end of the cooking support frame illustrated in FIG. 18.

FIGS. 18-20 illustrate an embodiment of a cooking support frame 170 comprising a base 20, a pair of uprights 22, a pair of handles 60, and an upper portion 172 adapted for support of a plurality of well-known skewers 174. The upper portion 172 comprises a loop hanger 184 transitioning from a first upright 22 and a cradle hanger 186 transitioning from a second upright 22 in parallel, spaced-apart juxtaposition. As shown in FIG. 19, the loop hanger 184 is an elongate member comprising a plurality of skewer loops 176 oriented transversely of the longitudinal axis of the loop hanger 184, and separated by elongated bridges 178. As shown in FIG. 20, the cradle hanger 186 is an elongate member comprising a plurality of upwardly-opening, arcuate, generally U-shaped skewer cradles 182, separated by elongated bridges 178. The skewer loops 176 are coaxially aligned with the skewer cradles 182 for support of the skewers 174 generally parallel to the longitudinal axis of the cooking support frame 170.

The skewers 174 can comprises any well-known configuration suitable for the purposes described herein. One embodiment shown in FIGS. 18-20 comprises an elongated, wire-like member having a skewer tip 180 at a first end and a handle 188 at a second, opposed end.

The skewers 174 are supported on the cooking support frame 170 by inserting the skewer tip 180 into a skewer loop 176 (FIG. 19) and supporting the handle end 188 in the skewer cradle 182, as shown in FIG. 20. The skewer 174 can be provided with a circular flange 189 extending coaxially therearound for locking the skewer 174 longitudinally in place. The flange 189 is preferably located a suitable distance from the handle end 188 so that the skewer cradle 182 is inserted between the handle end 188 and the flange 189 when the skewer 174 is placed in the cradle 182. The skewer 174 is prevented from moving longitudinally out of the skewer loop 176 and safely remains on the support frame 170. With the skewer 174 thus "locked" in place, it will resist dislodging from the cooking support frame 170 even when the cooking support frame 170 is bumped or tilted at a substantial angle.

The poultry wings 14 and legs 16 can be vertically suspended from the horizontal skewers 174. For legs 14, the skewers are inserted through the leg between the bone and cartilage just below the knuckle 54. For wings 16, the skewer is inserted between the bone and meat just below the carpal joint 52. Other vegetable pieces (peppers, onions, etc.) and other meat pieces (pork, beef, etc.) can also be skewered between the poultry parts to prepare a traditional shish-kebab. Thus, a nearly complete meal is quickly prepared and all cooked simultaneously. The skewers can be turned so that vegetables and other food items can be rotated for thorough cooking on top and bottom. However, rotating the skewers will not rotate the vertically suspended wings and legs, which remain suspended in place. The skewers 174 can also be used as a support platform for ribs, poultry pieces, vegetables, and the like.

FIGS. 23A-B illustrate an alternate embodiment of the skewer for use with the cooking support frame 170. The skewers 200 comprise an elongated, somewhat strap-like member comprising a shaft 202 transitioning to a handle 204 at a first end thereof. Preferably, the skewer 200 is fabricated of a length of steel having a width of approximately 5 millimeters and a thickness of approximately 2 millimeters and bent into the form illustrated in FIGS. 23A-B. The shaft 202 terminates at a second end in a point 206 adapted for penetration of the skewer 200 through selected food items. At approximately the midpoint of the skewer 200, the shaft 202 is twisted 180° to form a twist section 208 to provide the shaft 202 with an increased resistance to deflection when loaded with food items and suspended in the cooking support frame 170.

The handle 204 is illustrated in FIG. 23A as a somewhat oval-shaped structure formed by suitable bends in the skewer piece, with the free end of the skewer piece terminating along the shaft 202 adjacent the handle 204 in a stop 210. A weld or other suitable well-known attachment process can be used to secure the free end of the skewer piece to the shaft 202 to form a weldment 212 and the handle 204. The oval shape of the handle 204 enables two fingers to be inserted for removing the skewer 200 from the cooking support frame 170.

The skewer 200 is utilized in the same way as the skewer 174. The stop 210 is located a suitable distance from the handle 204 so that the skewer cradle 182 is inserted between the handle 204 and the stop 210 when the skewer 200 is placed in the cradle 182. The skewer 200 is prevented from moving longitudinally out of the skewer loop 176 and safely remains on the support frame 170.

Figure 21:
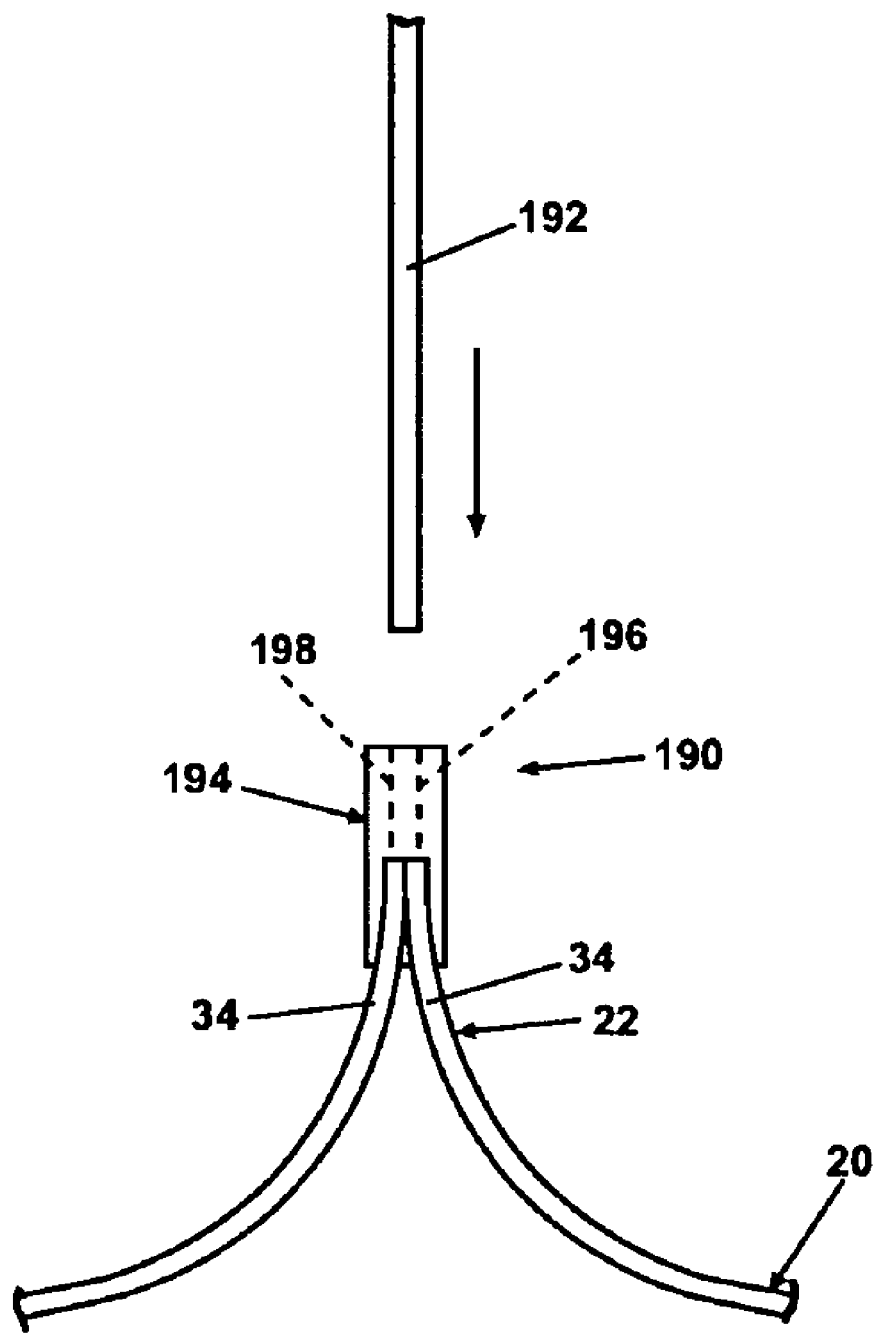
FIG. 21 is an enlarged perspective view of an embodiment of a coupling for connecting an upper portion of the cooking support frame to a lower base portion.

FIG. 21 illustrates an embodiment of the upright 22 which enables the selective interchanging of upper support frames, such as the hanger assembly 26, or the skewer assembly 172. The upright 22 comprises a support connector 190 intermediate the vertical members 34 extending from the base 20 and a vertical member 192 connected to the upper support frame. The support connector 190 comprises a collar 194 having an annular wall 196 defining a bore 198 extending therethrough. The support connector 190 is fixedly attached to the vertical members 34 by inserting the vertical members 34 into the bore 198 and securing the vertical members 34 to the support connector 190 through a suitable well-known method, such as welding, soldering or brazing, an adhesive, clamping bands, or the like. The bore 198 is adapted for slidable or frictional communication with the vertical member 192.

After seasoning and other preparation, the poultry wings and legs are easily attached to the frame prior to placing over the heat source. The frame configuration ensures that the wings and legs are "locked" in place and held in place by gravity. Once attached to the frame, the wings and legs remain in place even if the frame is tilted or bumped. A quantity of wings and legs can be attached to the frame without touching each other, thus enhancing even browning during cooking.

The thicker meat portions hang closer to the heat source while thinner portions remain further away, resulting in even cooking of each piece. There is no need to turn the meat during cooking. All sides and thicknesses cook evenly. Should the grill have uneven heat, food items that have finished cooking can be individually removed with tongs without disturbing other food items that are still cooking.

Cooking sauces can be readily applied while cooking by simply removing the frame from the grill or oven. The wings and legs are readily accessible with a basting brush.

An entire meal of vertically suspended poultry pieces can be cooked simultaneously with other vegetables and food items. The open, wire construction maximizes heat delivery to the food items, unlike grilling devices that incorporate a pan or other heat-blocking structure. Grilling or baking time is reduced, and there is no need for turning the food. After cooking, the frame can be placed on the table and used for serving the food. The frames are designed to be stacked or "nested" together, which greatly reduces shipping costs and display shelf space.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:

1. A cooking support frame for positioning food items above a grill comprising:
   a base;
   a rack extending from the base in a vertically-spaced relationship thereto, wherein the rack comprises a plurality of cradles disposed non-horizontally adjacent to each other along the rack and sized to support no more than a single food item; and
   a bridge portion extending between the plurality of food cradles, the bridge portion including at least one retainer aligned with each of the cradles for retaining a portion of the food associated with the respective cradle;
   whereby a single food item can be suspended from the cradle, maintained in a desired cooking position by gravity, and is easily accessible from any direction.

2. A cooking support frame according to claim 1, wherein the cooking support frame can be inserted through the base of an identical cooking support frame so that the cooking support frames are in a compact, nested configuration.

3. A cooking support frame according to claim 1, wherein the cooking support frame comprises a pair of identical subassemblies conjoined along the medial plane of the cooking support frame.

4. A cooking support frame according to claim 1, wherein the plurality of cradles opens toward the base.

5. A cooking support frame according to claim 1, wherein the plurality of cradles opens away from the base.

6. A cooking support frame according to claim 1, and further comprising a rib support adapted to support a rack of ribs in a generally vertical orientation relative to the cooking surface.

7. A cooking support frame according to claim 6, wherein the rib support is wire.

8. A cooking support frame according to claim 7, wherein the rib support extends from the base in a direction away from the cooking surface upon which the base may rest.

9. A cooking support frame according to claim 1, and further comprising a support connector for removably attaching the at least one hanger to the base.

10. A cooking support frame according to claim 1, wherein at least one of the plurality of cradles comprises a bight portion inclined toward a medial plane of the cooking support frame.

11. The cooking support frame of claim 1 wherein at least one of the plurality of cradles is U-shaped.

12. The cooking support frame of claim 1 wherein the at least one retainer comprises an upwardly-extending protrusion.

13. A cooking support frame for positioning food items above a grill comprising:
   a base;
   a rack extending from the base in a vertically-spaced relationship thereto, wherein the rack comprises a plurality of U-shaped wire food cradles disposed in an opposed, stepped configuration with respect to a medial horizontal axis of the rack, wherein one cradle on one side of the rack is in register with a hanger portion located between a pair of food cradles on an opposite side of the rack;

whereby the vertical relationship of the rack to the base allows food to be mounted to the rack above the base and maintained in a desired cooking position and the angle of mounting of the rack allows food to slide down the food cradle and stay in the desired cooking position.

14. A cooking support frame according to claim 1, and further comprising at least one upright extending from the base in a direction away from a cooking surface upon which the base may rest.

15. A cooking support frame according to claim 14, wherein the at least one upright further comprises at least one handle for lifting or transporting the cooking support frame.

16. The cooking support frame of claim 13 wherein the hanger portion comprises a generally horizontal wire member.

17. The cooking support frame of claim 13 wherein the hanger portion comprises a U-shaped recess.

* * * * *